May 10, 1932.   L. T. FREDERICK   1,858,225
MACHINE FOR FORMING COMMUTATOR RINGS

Filed Nov. 11, 1926

INVENTOR
LOUIS T. FREDERICK
BY Cheever & Cox ATTY'S.

Patented May 10, 1932

1,858,225

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MACHINE FOR FORMING COMMUTATOR RINGS

Application filed November 11, 1926. Serial No. 147,710.

My invention relates to apparatus for producing articles from superposed sheets of semi-plastic material and in particular to the manufacture of insulating rings especially rings of insulating material designed for commutators of dynamo electric machines.

One of the objects of my invention is to provide a device which will be economical of material and will produce composite articles and insulating rings having special strength and lightness. A further object of my invention resides in providing an apparatus for drawing, stretching and pressing together or molding finished rings of insulating material which are substantially V-shaped in cross section. Still another object of my invention resides in providing an apparatus for supporting a plurality of work sheets of different diameters and for die drawing such sheets to produce finished articles of desired cross section. Another object of my invention resides in providing an improved stripping mechanism for ejecting the finished article from the dies. An ancillary object of my invention is to form one of the dies as an ejector mechanism. Still a further object of my invention resides in providing an ejector mechanism actuated by one of the moving dies for quickly kicking out the finished article at a predetermined time. A further object of my invention resides in providing the recessed die with a stripping groove constructed and arranged to strip the finished article from the receding projecting die and to permit the finished article to be finally kicked out of the recessed die. A further object of my invention resides in the construction of the projecting die for cutting out the central sections of the work sheets, for finishing their edges, and for feeding the cutout blanks upwardly through the center of the projecting die. These and other objects of my invention will be readily appreciated from a perusal of the following specification when taken in connection with the accompanying drawings.

I obtain these objects by the mechanism illustrated in the accompanying drawings in which Figure 1 is an axial sectional view of the principal parts of the machine concerned with my invention.

Like numerals denote like parts throughout the several views.

Figures 1, 2, 3:
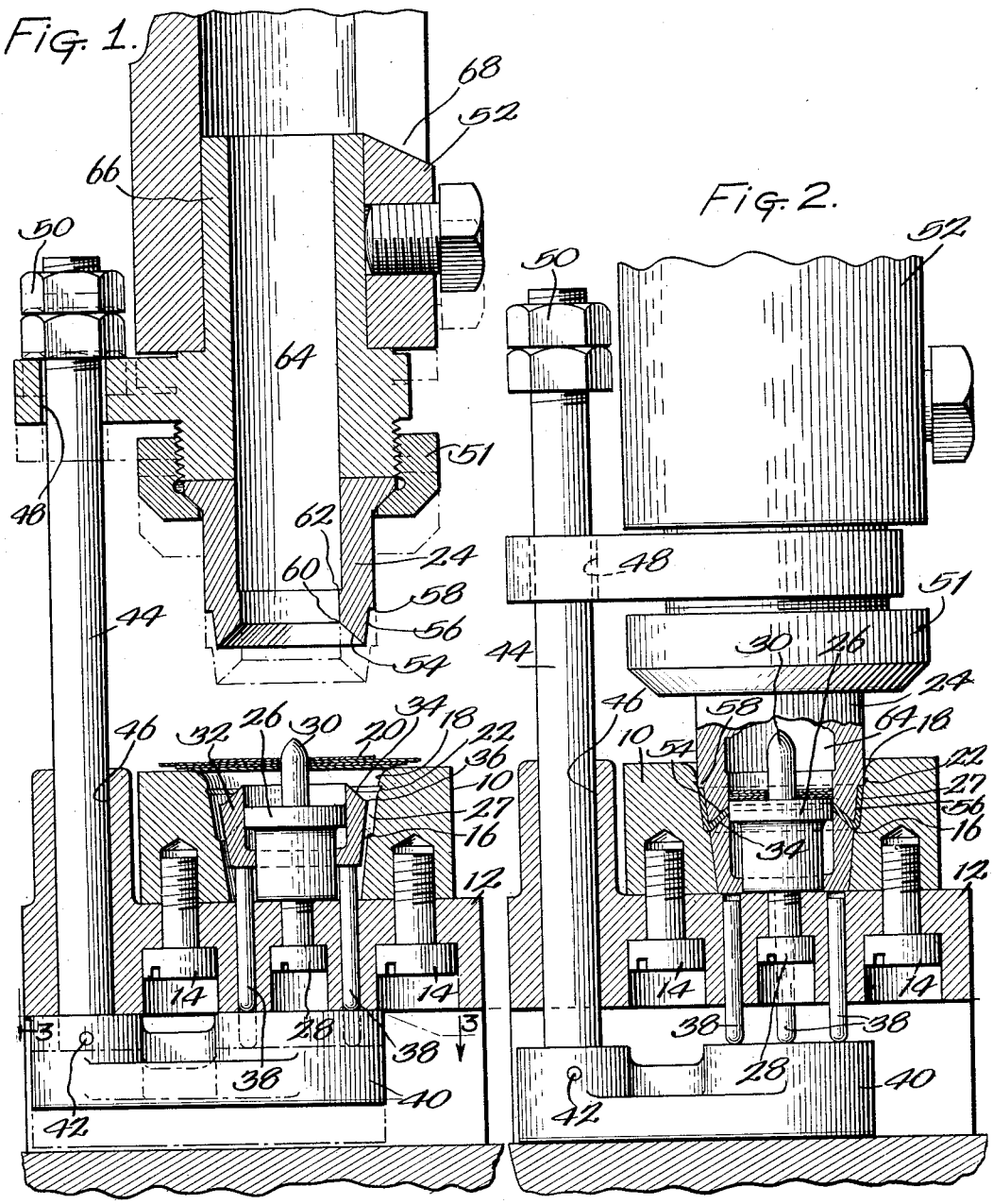
Figure 2 is a view of the parts shown in Figure 1 showing the same on a smaller scale and in a changed position which they will subsequently occupy during the course of operation.
Figure 3 is a bottom plan of the parts shown in Figure 2.

In general my improved device comprises a recessed die having a core and a receding die mounted in its recess, together with a relatively movable projecting die so arranged that when the plurality of sheets of mica or other semi-plastic material are centered on the core they are automatically drawn, pressed or molded into desired form, preferably V-shaped in cross section, the center portions of the mica sheets being properly severed and the completely finished article ring being automatically stripped from the dies. My improved stripping mechanism is especially novel and advantageous.

In the preferred form of mechanism illustrated in the drawings the recessed die 10 rests upon a suitable bed plate 12 to which it is anchored by bolts 14. The die has walls which diverge upward and outward, thus forming an approximately conical recess or chamber in which the work material is molded. This recessed die has an annular shoulder 16 about mid-height and at the upper end has a rounded annular shoulder 18 around which the work sheets 20 are bent during the forming operation. Somewhat below the upper rim the recessed die 10 has an annular groove and shoulder 22 for stripping the ring from the projecting die 24 in the manner which will be hereinafter explained.

Immovably secured to the bed plate 12 within the recessed die, is a core 26 which is cylindrical and concentric with the chamber but of smaller diameter, thus affording a space 27 between the core and the walls of the die. The core is anchored to the bed plate 12 by means of a bolt 28 which threads through the bed plate and is arranged at its lower end so that it may be turned thereby to permit the core to be adjustably positioned relative to the walls of the recessed die 10. Rising from the upper portion of the core 26 is a centering pin 30 which projects above the top of the recessed die 10 and serves to hold the work sheets 20 which are provided with perforations in the center concentric with the dies.

The receding die 32 is of annular form and slides vertically upon the core 26. At the upper end it has a conical surface 34 which converges upward and inward and terminates at the lower end in an annular shoulder 36. When this recessed die is depressed to its lowermost position, as shown in Figure 2, it rests upon bed plate 12 and in conjunction with the side walls of the recessed die forms a V-shaped annular groove for molding the work material. The receding die is guided by pins 38 which pass through the bed plate 12 and contact at their upper ends with the under side of the receding die 34. The lower ends of the pins 38 are adapted to come into operative contact with an ejector block 40 which underlies the bed plate 12 and is secured as at 42 to a vertical disposed rod 44. This rod 44 has a vertical bearing 46 in the bed plate 12 and passes at its upper end through an apertured arm 48 carried by the projecting die 44. The nuts 50 on the thread end of the rod 44 permit limited movement of the projecting die relative to the ejecting block 40 as shown clearly in Figures 1 and 2 since the rod 44 passes freely through the aperture on the arm 48.

The projecting die 24 is secured by a coupling 51 to a vertically reciprocating member 52. The projecting die is annular in cross section and has an internal conical surface 54 and an external conical surface 56, the latter terminating at the top in an annular shoulder 58. The surfaces 54 and 56 form a V-shaped section complemental to the V-shaped channel formed conjointly by the recessed die 10 and receding die 32. Shoulder 58 serves to finish the upper margin of the finished article while the shoulder 60, located at the upper margin of the conical surface 54, serves as a trimmer which operates in conjunction with the upper edge of the core 26 to sever the central portion of the work sheets from the molded portions as illustrated in Figure 2. It will be noticed that the projecting die 24 is hollow and is formed at its lower end with an internal shoulder 62. The bore 64 of the projecting die 24 communicates with a sleeve like extension 66 which terminates at its upper end in a downwardly inclined chute like portion 68 formed in the reciprocating member 52. By means of this construction and arrangement, during the successive reciprocations of the die 24 in cutting out the central portions of the work sheet immediately surrounding the center pin 30, these cut-out sheets in the form of small discs are successively fed upwardly through the bore 64. In this feeding movement the shoulder 62 effectively serves as a means for forcing them upwardly since the expansion of the discs as they pass the shoulder 62 prevents them from again falling back through at the start of the feed. The discs as they pass down the chute 68 are collected in any desirable manner for other uses.

In the complete operation of my apparatus, the work sheets 20 are laid upon the top of the recessed die 10. They are punched at the center so as to fit over the centering pin 36 and in practice are "mica sheets". These sheets are formed of mica flakes secured by shellac or other binder and are known articles of commerce. They are not, therefore, semiplastic, and hence under pressure can be molded and configurated to various forms, as for example commutator rings, as here shown.

The number and size of the work sheets may be varied but in the present case I have shown four of varying width but in general arranged so that when placed in superimposed position as shown and molded by the dies the greatest combined thickness is disposed at the inner portions of the finished rings. Manifestly this arrangement of the different thicknesses of the sheet may be varied to produce ring cross sections varying in thickness at desired zones or portions.

In the beginning the receding die 32 stands in raised position as shown in Figure 1. This is because the block 40 is held in upward position by means of the connecting rod 44 and the arm 48 carried by the projecting die which likewise is in its uppermost position. In this position, the work sheets 20 are freely supported on the upper edges of the recessed die 10 and are centrally supported by means of the centering pin 30 passing through the central coaxial apertures of the work sheet. This means of holding the work sheets at their centers only while subjecting their outer portions to the drawing and die pressing operation is essential because of the different diameters of the work sheets; it being impossible to firmly hold them at their outer edges because of these differing diameters. As the projecting die descends the block 40 likewise descends permitting the pins 38 to shift downwardly thereby letting the receding die 32 likewise descend to the position shown in Figure 2. During this downward movement of the projecting die and likewise the receding die relative to the recessed die 10, as the lower face of the projecting die reaches the work sheets it commences to bend them around the upper rim 18 of the recessed die. As the upper die descends still further it comes in coaction with the receding die 34 thus giving the inner portion of the work sheets an upward bend which is shown as the upward bend of the finished ring in Figure 2. During the descent of the projecting and receding dies, the work sheets are drawn and stretched, the marginal portions of the work sheets being gradually worked inwardly and upwardly by the walls of the recessed die until the receding die 34 finally comes to rest on its seat on the bed plate 12 shown in Figure 2. The dies are now closed and the work material assumes the finished form. During this descent of the moving dies, the inner edge 60 of the projecting die 24 coacts with the upper edge of the core 26 thus cutting out the central portion of the work sheets and forming a circular aperture at the center of the finished ring as shown in Figure 2 of the drawings.

It will be observed that the diameter of the largest work sheet 20 is such that its outer upper rim will fit beneath the shoulder 58 of the projecting die when the mold is completely closed as shown in Figure 2 and the other sheets except the uppermost one have been drawn and stretched to the same length so that their outer edges will substantially register as shown in Figure 2. This shoulder 58 serves to finish the upper outer edge of the insulating ring. It will also be observed that by reason of the arrangement of the superimposed sheets disposed so that the greater thickness of the combined sheets is at the center, when the mold is closed this extra thickness of the inner portion of the sheets is utilized at the apex or lowest portion of the V-shaped ring. This added or extra thickness is necessary at this point due to the sharp bend in the work sheets. By reason of the molding and pressing action of the dies on the work sheets the finished ring is of special strength and durability, the strength being greatest at the inner portions where most greatly needed. I do not herein claim the method or article produced by the method or by this apparatus since these inventions form the subject matter of a separate application filed by me on the 17th day of April, 1926, Ser. No. 102,820.

The ejector mechanism comprises the receding die 34 in cooperation with the ejector groove 22 which is formed on the inner wall of the recessed die 10 approximately on the same level as or slightly above the location of shoulder 58 when the mold is in closed position as shown in Figure 2. Starting with the ring shown in completely molded and punched out form as shown in Figure 2 of the drawings, when the projecting die 24 starts its travel upwardly it will tend to withdraw from the molded ring. If the ring sticks or adheres to the projecting die 24, it will carry the ring upwardly with it and as it does so the upper outer edge of the ring will tend to open and in doing so will lodge against the over-hanging shoulder of the stripping groove 22 in the adjacent face of the recessed die. This will cause the molded ring to be stripped from the upwardly moving projecting die 24. It will be noticed in Figure 2 that the tops of the pins 38 are somewhat below the lower face of the receding die 34 and that the arm 48 is slightly larger than the rod 44 so that when the projecting die 24 moves upwardly the rod 44 connected to the ejector block 40 is not immediately operated. As soon however as the arm 48 on the die 44 reaches a higher position arm 48 will strike the nuts 50 thereby raising the ejector block 40 and driving the pins upwardly to kick the receding die 34 upwardly. If the upper edge of the molded ring is lodged against the over-hanging shoulder of the groove 22 the ejecting or upward movement of the receding die 34 will positively strip the ring from this shoulder and in this stripping movement will finish the outer face of the ring.

From the foregoing it will be seen that my machine is particularly adapted to produce commutator rings having special characteristics that is for example having the material of varying thickness, thicker at one portion and thinner at another portion the whole ring being worked into shape and finally trimmed and finished in a certain operation. It will also be apparent that the ejecting mechanism not only operates automatically to strip the finished ring from the dies but also acts in a slight manner to trim or finish the outer face of the upper portion of the ring.

It must be apparent that the apparatus herein shown and described is not to be limited to the various details of construction but is capable of changes and modifications within the scope of the invention as set forth in the following claims.

Having thus described my invention what I claim as new and desire to secure by Letters Patent is:

1. A machine for making insulating rings, having a recessed die provided with an annular shoulder at the top, a receding die which when depressed forms an annular channel in conjunction with the recessed die, and an annular projecting die for forcing the work sheets into the channel formed by the recessed and receding dies, the projecting die having an annular shoulder for cooperating with the annular shoulder of the recessed die for finishing the work sheet as the recessed die descends.

2. A machine for making insulating rings which have an annular channel, a recessed die, a receding die which when depressed forms in conjunction with the recessed die an annular channel, a center core having an annular shoulder, and a projecting die having a projection for forcing the work sheets into the annular channel formed by the recessed and receding dies, the projecting die having an inner shoulder cooperating with the annular shoulder on the core for removing the surplus central portions of the work sheets.

3. In a machine for making insulating rings whose walls diverge upward and outward, a recessed die having walls which diverge upward and outward, and a reciprocating projecting die for forcing the work sheets into the recessed die, the recessed die having an annular groove in the wall into which a portion of the work sheet may enter for stripping the work sheets from the projecting die as the latter withdraws from the recessed die.

4. A machine for making insulating rings which have a V-shaped annular channel, a recessed die having walls which diverge upward and outward, a receding die having walls projecting upward and inward and co-operating with the recessed die to form an annular V-shaped channel, a projecting die for forcing the work sheets into the said annular channel, the recessed die having an annular groove in the wall for receiving a portion of the work to loosen the finished article from the projecting die as the latter withdraws from acting position.

5. A machine for making insulating rings which have a V-shaped annular channel, a recessed die, a centering pin for centering the work sheets thereon, a receding die cooperating with the recessed die to form an annular V-shaped groove, a projecting die having an annular V-shaped end for forcing the work sheets into the said V-shaped channel, and a core concentric with the pin and cooperating with the projecting die for trimming the surplus material from the center of the ring.

6. In a device of the class described, the combination of a recessed die provided on its upper face with a circumferential ledge and a central upstanding centering pin for supporting superposed mica discs having registering apertures centering on said pin with their free edges lying on said circumferential ledge, said recessed die being formed to provide a circumferential recess of angular cross section, and a die adapted to be projected into said recess and to form the complement of said angular recess, said projecting die being constructed and arranged to contact the intermediate portions of said mica sheets and to press them into the die recess.

7. A drawing die for forming superposed sheets of semi-plastic material into finished articles, said die being formed to provide a relatively stationary central portion and a relatively movable portion adapted to recede with respect to the stationary portion during the forming operation to permit said central stationary portion to aperture the semi-plastic material, said relatively movable portion being adapted thereafter to advance with respect to the stationary portion, in order to eject the formed article from the die.

8. In a combination, a recessed die having a central core, a receding die mounted in said recess and movable about the core and means for shifting said second die for ejecting the finished article.

9. In combination a bed plate, a recessed die mounted thereon, a core centrally mounted in said die, a receding die mounted in said recessed die and surrounding said core ejector, pins shiftable passing through said bed and adapted to abut the bottom of said receding die, an ejector block underlying said pins, a projecting die adapted to be reciprocated toward and from said recessed die and a lost motion connection between said reciprocating die and said ejector block.

10. In combination with a recessed die, a projecting die adapted to enter said recessed die to press superposed sheets of semi-plastic material, the walls of said recessed die being provided with a stripping groove adapted to lie in the path of movement of the finished article as it adheres to the retreating reciprocating die and to strip the finished article therefrom.

11. In combination a recessed die, a complementary reciprocating die movable into and out of said first mentioned die, and a stripping groove in said first mentioned die adapted to strip the finished article from said reciprocating die.

12. In combination a recessed die, a complementary reciprocating die formed with an over-hanging shoulder forming a finishing member for the edge of superposed sheets of semi-plastic material when pressed between said dies, and a stripping groove formed with an over-hanging shoulder disposed in the walls of said recessed die immediately above the pressed edge of the sheets when the dies are closed for catching the upper edge of the completed article when it adheres to the retreating reciprocating die for stripping it from such die.

13. In combination a recessed die and a complemental projecting die adapted to be projected into and to be withdrawn from said recessed die, said projecting die having an over-hanging shoulder forming a finishing member for the edge of the material to be pressed, the recessed die being provided with a stripping groove located above the normal position of this edge when the dies are closed for stripping the finished article from the retreating projecting die, a portion of the recessed die being shiftable to eject the finished article from the stripping groove and from the recessed die.

14. A device of the class described, the combination of a recessed die having a central core forming a cutting edge, a receding die disposed in the recess of said first die and surrounding said core, a projecting die complemental to said recessed and receding dies to form a desired die chamber for pressing superposed sheets of semi-plastic material, said projecting die having an internal cutting edge cooperating with the cutting edge of said core and an over-hanging shoulder forming a finishing member for the outer edge of the work sheets.

15. In a device of the class described, the combination of a recessed die having a cutting edge and a central upstanding core provided with a centering pin for receiving superposed sheets of semi-plastic material thereon, an overhanging projecting die formed with complemental die surfaces and a complemental cutting edge, said projecting die being hollow for permitting the cutout blanks to automatically feed upwardly therethrough.

16. In combination a recessed die and a projecting die said dies having complemental cutting members and complemental die faces for die pressing laminated sheets of semi-plastic material, said projecting die being hollow for permtting the cutouts to be automatically fed therethrough.

17. In combination, two relatively movable dies adapted to receive therebetween superposed sheets of semi-plastic material having different diameters and having central openings, said dies having a stationary portion for holding said sheets in a desired position relative to one of said dies, said portion being constructed and arranged to center said sheets and hold them solely by means of their central openings, and a movable portion adapted to recede relatively with respect to the stationary portion to allow said portion to aperture the semi-plastic material.

18. A machine for making mica insulating rings comprising an annular projecting die, a recessed die for receiving the projecting die, said recessed die having a central pin for holding the work material against lateral displacement, an annular depressible portion encircling the pin and means to raise the depressible portion when the projecting die is withdrawn from the recessed die.

19. A machine of the class described having a recessed die the upper rim whereof may support work sheets, a centering pin within the area encircled by said die, a central die within the recessed die, and a hollow projecting die the outer walls whereof cooperate with the walls of the recessed die to configurate the work sheets, the inner wall of the projecting die cooperating with the rim of the central die to cut away the central portion of the work sheets prior to the final seating of the projecting die in the recessed die.

20. In a device of the class described, a stationary die having a central fixed portion and a relatively movable portion encircling said fixed portion and a movable die adapted to co-operate with said relatively movable portion in order to form moldable material arranged therebetween, said relatively movable porton being adapted to recede relative to said fixed portion in order to permit the latter to co-operate with said movable die to cut out a portion of said moldable material as a part of the forming operation.

In witness whereof, I have hereunto subscribed my name.

LOUIS T. FREDERICK.